M. C. WELD.
Vessel for Setting Milk.

No. 218,608.  Patented Aug. 12, 1879.

Witnesses
John Becker
Thomas E. Birch

Inventor
Mason C. Weld
by Attorneys
Brown & Brown

UNITED STATES PATENT OFFICE.

MASON C. WELD, OF CLOSTER, NEW JERSEY.

IMPROVEMENT IN VESSELS FOR SETTING MILK.

Specification forming part of Letters Patent No. 218,608, dated August 12, 1879; application filed May 31, 1879.

*To all whom it may concern:*

Be it known that I, MASON C. WELD, of Closter, in the county of Bergen and State of New Jersey, have invented certain Improvements in Vessels for Setting Milk, of which the following is a description, reference being had to the accompanying drawings, forming part of this specification.

This invention relates to vessels for setting milk for raising cream and for other purposes by immersing or submerging the cans or vessels containing the milk in water or placing them in other fluid of a different temperature from that of the milk.

The invention has for its object a rapid changing of the air over the surface of the milk in the cans or vessels until the temperature of the milk is the same, or approximately so, as that of the water or fluid in which the cans or vessels containing the milk are immersed or submerged, or by which they are surrounded, or until the milk has been sufficiently treated.

To this end the invention consists in a combination, with a milk can or vessel designed to be set in water or other fluid for the purpose of setting the milk, or with a close-fitting lid or cover applied to said vessel, of air circulating or ventilating ducts in communication below with the space above the milk in the can or vessel, and in further communication above with the outside atmosphere at different altitudes, respectively, substantially as hereinafter described.

It also consists in a combination, with the vessel containing the milk and air ventilating or circulating ducts applied thereto, of a float for regulating the immersion of the vessel.

Figure 1:
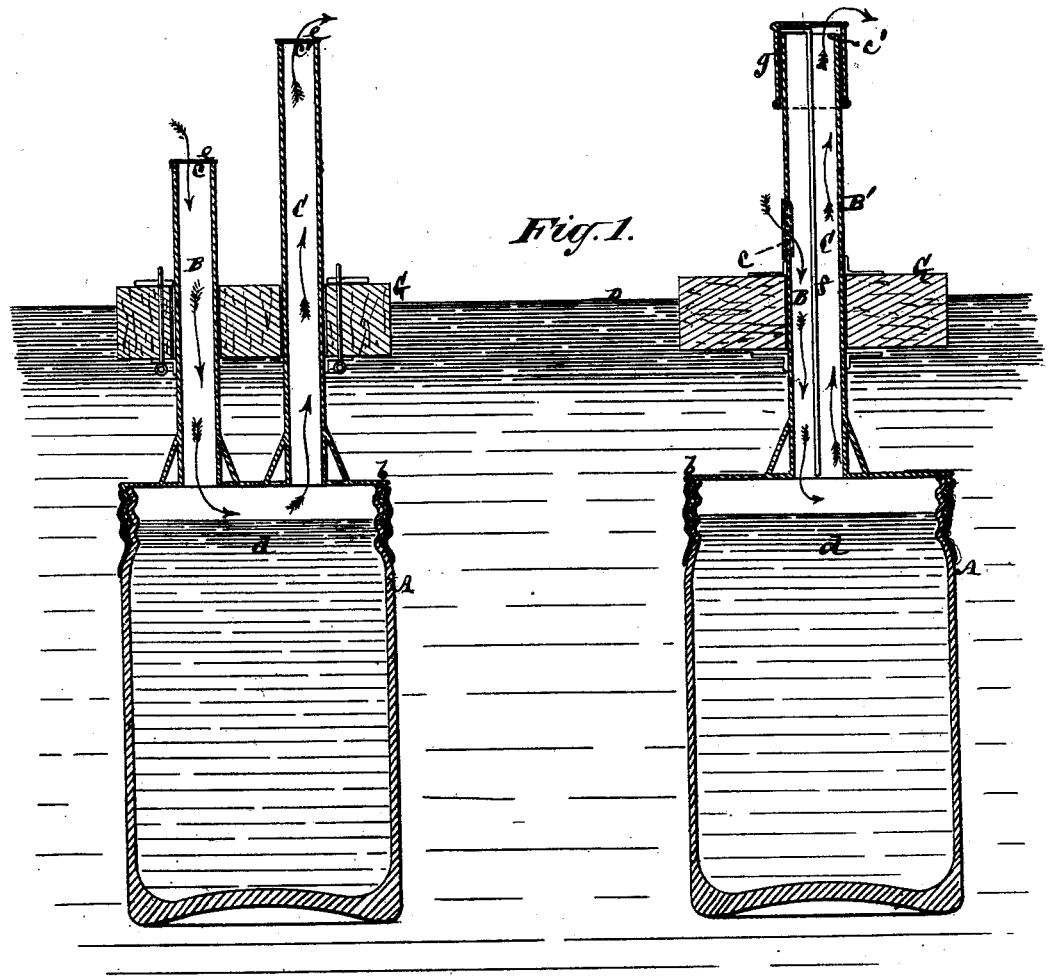
Figure 2:
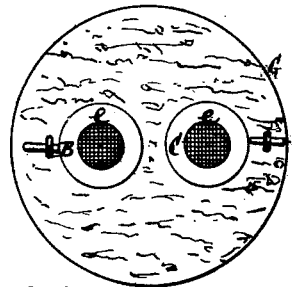
Figure 3:
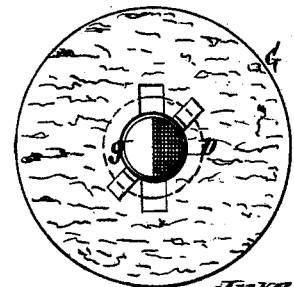

In the accompanying drawings, Figure 1 represents a vertical section of two milk cans or vessels having hermetically-sealing lids or covers, and containing milk to be set or treated, submerged in a body of water or other suitable fluid, and having applied to them the means, under two different modifications of construction, which I employ for producing a rapid change of air over the surface of the milk. Figs. 2 and 3 are plans of said cans with said air changing or circulating means attached.

A A are the cans or vessels containing the milk to be treated. These cans, which may be in the form of jars and of any suitable material, should be fitted with close-fitting lids or covers *b*, to exclude ingress of the water or other fluid in which said cans are submerged, or by which they are surrounded. Ordinarily water will be used as the medium for submersion of said cans or vessels, or for surrounding them to set the milk; but cold air might be used instead, and when it is required to treat the milk otherwise than for raising cream the fluid in which the cans or vessels are submerged, or by which they are surrounded, may be of a higher temperature than the milk.

To simplify description, the fluid in which the cans or vessels are immersed or submerged, or by which they are surrounded, will be hereinafter referred to as water.

I will now proceed to describe the means used to effect the change or circulation of air over the surface of the milk in the immersed or submerged cans or vessels.

Referring, in the first instance, to the can shown at the left hand of Fig. 1 and in Fig. 2 of the drawings, said can is provided at or near its top, above the surface of the milk, *d*, therein, with two pipes or ducts, B C, of unequal length, and arranged to extend up above the water, D, in which the can is submerged, so that the outer opening, *c*, which is exposed to the atmosphere above the water of the one duct, B, is at a lower elevation than the outer and similarly-exposed opening, *c'*, of the other duct, C. By means of these unequal air circulating or ventilating ducts B C a rapid change of outside air is obtained over the surface of the milk in the can until the temperature of the water in which the can is submerged is the same as that of the milk in the can, or approximately so.

It is preferred to attach the ducts B C to the cover *b* of the can. The openings *c c'* in said ducts, which are exposed to the outside atmosphere, should be covered with wire-gauze *e*, or be similarly protected against the entrance of insects, and be provided with caps to exclude dust or to arrest the circulation of air through the ducts when that is required.

Instead of the air-circulating ducts which connect with the upper portion of the can, or with its close-fitting cover, being separate structures, as shown to the left hand of Fig. 1 and in Fig. 2, they may be formed of or form a single tube, B', as shown to the right hand of Fig. 1 and in Fig. 3, said single tube being divided by a septum, $f$, throughout its length, to form the two ducts B and C, one, B, of which is closed at its top, but communicates with the outer air by an opening, $c$, at a proper distance below its top, while the other duct, C, communicates with the outer air by an opening, $c'$, at its top, or at a higher elevation than the opening $c$ of the duct B.

The action of this last-described modification on the milk is the same, and accomplished in substantially the same manner, as that described for the modification shown to the left hand of Fig. 1, and the ducts B C should have their openings $c$ $c'$ suitably protected by wire-gauze or its equivalent against insects; also be provided with suitable caps or devices for excluding dust and shutting off the circulation when required—as, for instance, the opening $c$ may be provided with a sliding shutter, and the opening $c'$ with a valvular rotating cap, $g$, of partially-close and partially open or reticulated construction.

Detachable weights may be applied to the bottoms or other portions of the cans to keep the latter submerged when necessary—as, for instance, when the cans contain considerably less than a full charge of milk. When, however, the cans or vessels, as will frequently be the case, are submerged or set floating in a pool or stream, and not allowed to rest upon the bottom of the latter, a float, G, is applied to either vessel, or to the duct or ducts mounted thereon, to keep the vessel sunk to a proper depth in the pool or stream, so that whatever quantity of milk is in the vessel it will be always properly submerged. Said float might be made of cork, but preferably of wood, to more effectually assist, by its weight, in the submersion of the vessel. The float G prevents the submersion of the vessel below the lower opening, $c$, of the one ventilating-duct, so that water cannot pass in through said duct, and by its keeping the vessel floating it makes the latter easier to manage.

Any number of vessels thus provided with floats may all be put in a pool or stream at any one point, and be floated off by pushing them away. Said vessels may be of about the size of ordinary cooler-pails—say eight inches in diameter by twenty inches in height; or they may be larger or smaller, as desired.

The floats G may be removably secured to the vessels A, either by rods and cotters, as shown to the left hand of Fig. 1 and in Fig. 2, or by upper and lower lips or ears projecting radially from the tube B' in Fig. 2, and inserted, when attaching the float, through radial openings in the latter, and afterward turning the float to put said openings out of line with said lips or ears; or the floats may be attached in any other suitable manner.

I claim—

1. The combination, with the milk can or vessel having a close cover or top, of air circulating or ventilating ducts in communication below with said vessel, and in further communication, respectively, at different altitudes, with the atmosphere above and outside of said vessel, substantially as and for the purposes herein specified.

2. The combination, with the close-fitting lid or cover of a milk can or vessel, of air circulating or ventilating ducts attached to said cover, open below through the latter, and in communication, at different altitudes, respectively, with the outside atmosphere above said cover, essentially as and for the purpose described.

3. The combination, with the milk can or vessel having a close cover or top and air circulating or ventilating ducts in communication below with said vessel, and with the atmosphere at different altitudes, respectively, above and outside of said vessel, of an attached float adapted to regulate the depth of submersion of said vessel, essentially as described.

MASON C. WELD.

Witnesses:
FREDK. HAYNES,
THOMAS E. BIRCH.